United States Patent [19]
Matsumoto et al.

[11] Patent Number: 5,812,406
[45] Date of Patent: Sep. 22, 1998

[54] METHOD AND APPARATUS FOR RECORDING OPERATING STATUS OF AN NC PROCESSING MACHINE

[75] Inventors: Shigeharu Matsumoto; Hiroshi Yoshikawa; Nobuo Sakurai, all of Kanagawa, Japan

[73] Assignee: Amada Metrecs Company, Limited, Kanagawa, Japan

[21] Appl. No.: 554,443

[22] Filed: Nov. 8, 1995

[30] Foreign Application Priority Data

Nov. 22, 1994 [JP] Japan .................................. 6-287814

[51] Int. Cl.$^6$ .......................... G05B 19/18; B21B 37/00; B21B 39/14
[52] U.S. Cl. ............................... 364/474.16; 364/474.17; 364/474.25; 364/474.03; 364/551.02; 83/527; 83/556; 83/75.5; 72/20.1; 72/17.2; 72/389.3; 72/389.1
[58] Field of Search ........................ 364/474.16, 474.17, 364/474.22, 474.25, 474.03, 551.01, 551.02; 83/527, 550, 554–556, 69, 73–75, 667–670, 526, 75.5, 72; 72/20.1, 17.2, 389.3, 389.1, 386

[56] References Cited

U.S. PATENT DOCUMENTS

| | | |
|---|---|---|
| 4,346,446 | 8/1982 | Erbstein et al. .................. 364/551.01 |
| 5,386,555 | 1/1995 | Kuroda et al. .......................... 395/601 |
| 5,390,331 | 2/1995 | Yui .......................................... 395/442 |
| 5,485,391 | 1/1996 | Lindstrom .......................... 364/474.17 |
| 5,488,564 | 1/1996 | Ikeda .................................. 364/474.16 |
| 5,511,194 | 4/1996 | Shirakata et al. ...................... 395/674 |
| 5,528,487 | 6/1996 | Adachi et al. ..................... 364/167.01 |
| 5,615,568 | 4/1997 | Matsumoto et al. ..................... 72/20.1 |
| 5,676,004 | 10/1997 | Matsumoto et al. ..................... 72/17.2 |

*Primary Examiner*—Emanuel Todd Voeltz
*Assistant Examiner*—Tuan Q. Dam
*Attorney, Agent, or Firm*—Greenblum & Bernstein P.L.C.

[57] ABSTRACT

A method and apparatus for recording an operating status of an NC processing machine is provided. Measuring and recording operations can be performed with trial processing and actual processing distinguishing from each other. In order to record the operating status in a case where an NC apparatus is controlled to cause an NC processing machine i.e. a press brake, to perform continuous processing according to a processing program, a processing condition for a work used in previous processing is stored in a memory. A comparison/decision unit decides whether a processing condition for a work used in current processing coincides with the stored processing condition of the work in the previous processing. If the current processing condition coincides with the previous processing condition, a recording unit records the current processing as actual processing. On the other hand, if the current processing condition does not coincide with the previous processing condition, the recording unit records the current processing as trial processing.

15 Claims, 4 Drawing Sheets

METHOD AND APPARATUS FOR RECORDING OPERATING STATUS OF AN NC PROCESSING MACHINE

BACKGROUND OF THE INVENTION

1. Field of the Invention

The present invention relates to a method and apparatus for recording an operating status of an NC processing machine, and more particularly, to a method and apparatus for recording an operating status of an NC processing machine in which a recording operation can discriminate between a trial processing operation and an actual processing operation.

2. Description of the Prior Art

In a conventional method and apparatus for recording an operating status of an NC processing machine, a recording operation is generally performed without deciding whether processing to be performed is a trial processing or an actual processing (when a product is actually processed).

However, in such a prior art, trial processing and actual processing cannot be discriminated from each other in the number of operating times or the operating time period.

More specifically, trial processing must originally account for the man-hour for setup, and the actual processing must originally account for the man-hour for real operating. If the trial processing cannot be discriminated from the actual processing, the correct standard man-hour cannot be grasped, and rational production planing or highly reliable cost accounting may not be performed.

SUMMARY OF THE INVENTION

The present invention has been made in consideration of the above prior art, and has as its object to provide a method and apparatus for recording an operating status of an NC processing machine in which measuring and recording operations can be performed with discriminating a trial processing and an actual processing from each other.

According to a first aspect of the present invention, there is provided a method of recording an operating status of an NC processing machine, in which a processing condition is controlled by an NC apparatus to perform continuous processing according to a processing program, characterized by deciding whether a processing condition in a current processing coincides with a processing condition in a previous processing, recording the current processing condition as an actual processing if the current processing condition coincides with the previous processing condition, and recording the current processing as a trial processing if the current processing condition does not coincide with the previous processing condition.

According to a second aspect of the present invention, there is provided an operating status recording apparatus of an NC processing machine, in which a processing condition is controlled by an NC apparatus to perform continuous processing according to a processing program, comprising a memory that stores a processing condition in a previous processing, a comparison/decision unit that decides whether a processing condition in a current processing coincides with the processing condition in the previous processing stored in the memory, and a recording unit that records the current processing as actual processing if the current processing condition coincides with the previous processing condition and for recording the current processing as trial processing if the current processing condition does not coincide with the previous processing condition.

In the method of recording operating status of an NC processing machine according to the first aspect of the present invention, in order to record operating status in a case wherein the NC processing machine performs continuous processing according to a processing program, it is decided whether a processing condition for a currently processed work coincides with a processing condition for a work in previous processing. If the current processing condition coincides with the previous processing condition, the current processing is recorded as actual processing. If the current processing condition does not coincide with the previous processing condition, the current processing is recorded as trial processing.

In the operating status recording apparatus of NC processing machine according to the second aspect of the present invention, in order to record an operating status in a case wherein an NC apparatus is controlled to cause the NC processing machine to perform continuous processing according to a processing program, a processing condition for a work used in the previous processing is stored in a memory. The comparison/decision unit decides whether a processing condition for a work used in the current processing coincides with the stored processing condition for the work in the previous processing. If the processing condition for the current work coincides with the previous processing condition, the recording unit records the current processing as actual processing. On the other hand, if the current processing condition does not coincide with the previous processing condition, the recording unit records the current processing as trial processing.

The nature, principle, and utility of the invention will become more apparent from the following detailed description when read in conjunction with the accompanying drawings.

DETAILED DESCRIPTION OF THE PREFERRED EMBODIMENT

A preferred embodiment of the present invention will be described below with reference to the accompanying drawings.

Figure 3:
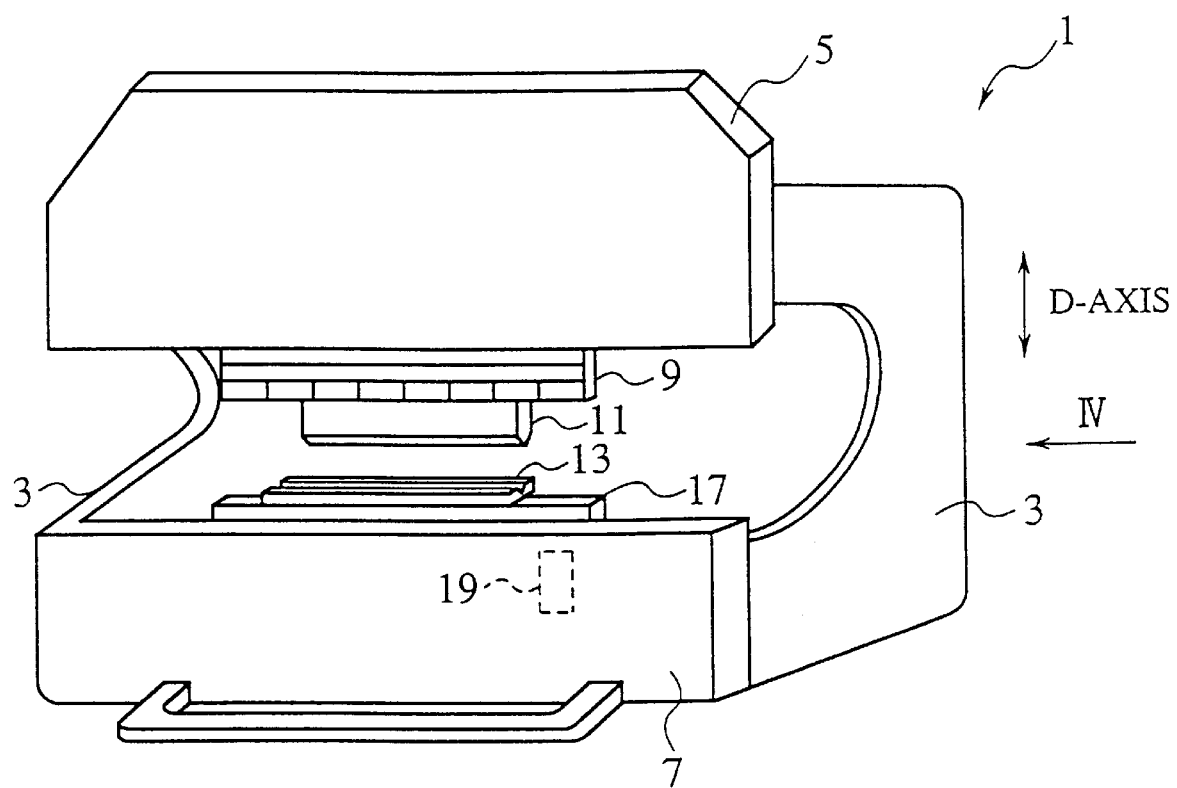
FIG. 3 is a perspective view showing a press brake as a processor in which the method and apparatus for recording operating status of an NC processing machine according to the present invention are applied.
Figure 4:
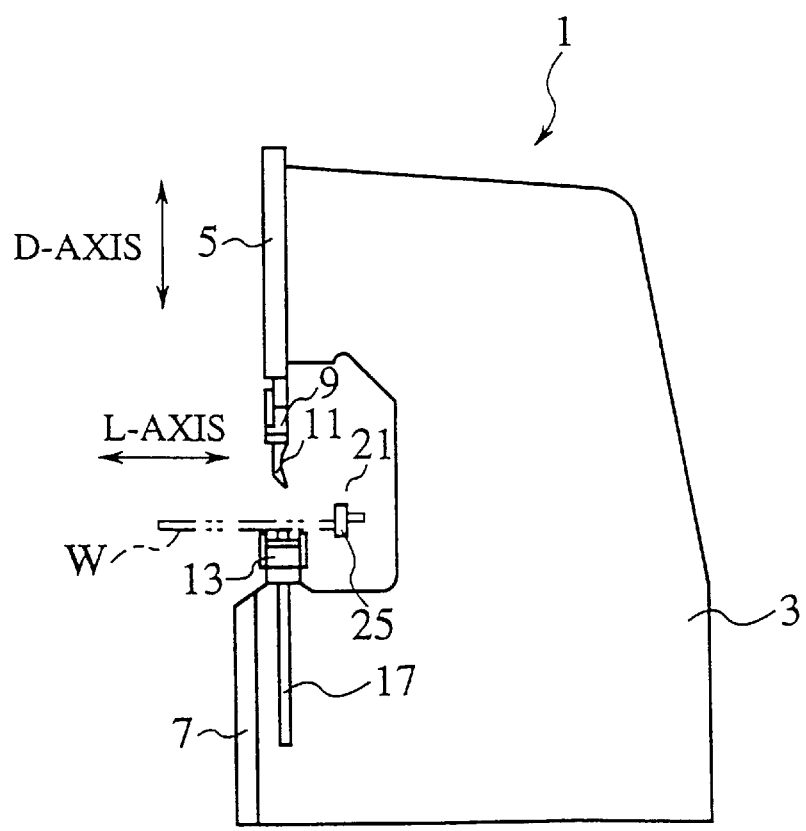
FIG. 4 is a side view showing the press brake when viewed from a direction IV in FIG. 3.

FIGS. 3 and 4 show a press brake 1 serving as an NC processing machine. In this press brake 1, a side-view frame 3 having a C-shape when viewed from a lateral direction is arranged to stand in a back/forward direction, and upper and lower portions of a front face side of the side-view frame 3 are integrally connected to an upper frame 5 and a lower frame 7, respectively.

A punch 11 is fixed to a lower portion of the upper frame 5 through a punch holder 9. Inside the lower frame 7, a die 13 opposing the punch 11 is attached to an upper end of a ram 17 serving a processing means which is vertically moved by a D-axis motor 15 (see FIG. 2). A ram position detector 19 is attached to the ram 17 and designed to generate an upper limit point signal when the ram 17 reaches an upper limit point in a D-axis direction a processing operation.

Referring to FIG. 4, a back gauge 21 for determining a position of a work W in the back/forward direction (L-axis direction or the lateral direction in FIG. 4) is arranged to be made movable by an L-axis motor 23 (see FIG. 2) in the back/forward direction. A patch 25 is arranged on the back gauge 21 to be made movable by a patch moving means (not shown) in the lateral direction (perpendicular direction in FIG. 4) and the vertical direction.

Therefore, when a bending operation is to be performed by the press brake 1 arranged as described above, the predetermined punch 11 and the predetermined die 13 are set, an upper limit point coordinate on the D-axis of the ram 17 and an L-axis coordinate of the back gauge 21 are set. The work W is brought into contact with the patch 25 of the back gauge 21 so as to be set at a predetermined position, the ram 17 is moved upward by the D-axis motor 15, and the bending operation is performed by the cooperation of the punch 11 and the die 13.

Figure 2:
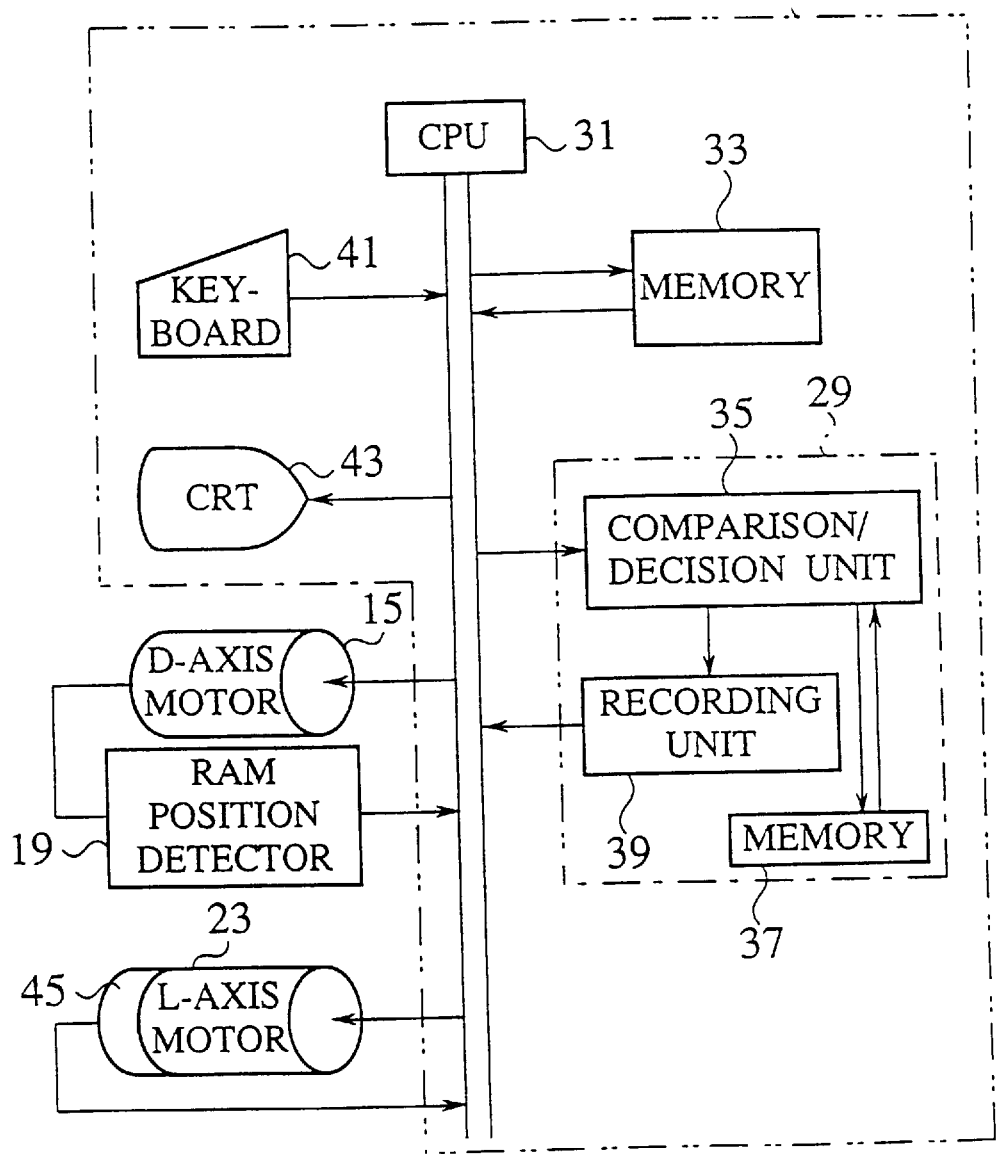
FIG. 2 is a block diagram showing the arrangements of an NC apparatus and an apparatus for recording an operating status of an NC processing machine.

FIG. 2 shows an NC apparatus 27. The NC apparatus 27 and an NC processing machine operating status recording apparatus 29 are described below with reference to FIG. 2.

In the NC apparatus 27, a CPU 31 serving as a central processing unit is arranged. A memory 33 for storing a processing program and processing data such as the number of products to be processed, or the operation recording apparatus 29 for recording operating status are connected to the CPU 31. This operation recording apparatus 29 comprises a comparison/decision unit 35, a memory 37, and a recording unit 39.

As external units, a keyboard 41 serving as an input means and a CRT 43 for displaying a result on a screen are connected to the CPU 31. The D-axis motor 15 for driving the ram 17 of the press brake 1, the ram position detector 19 attached to the ram 17, the L-axis motor 23 for moving the back gauge 21, and an L-axis position detector such as an encoder 45 built in the L-axis motor 23 are connected to the NC apparatus 27.

A basic view for deciding whether corresponding processing is trial processing or actual processing will be described below.

The processing state of the work W processed by the press brake 1 of this embodiment is determined by positioning coordinates in the D- and L-axis directions. For example, when processing for a square work W is performed in such a manner that the four sides of the work W are bent upward, the D- and L-axis coordinates in the bending of each side are given by combinations (D1,L1), (D2,L2), (D3,L3), and (D4,L4). Therefore, the coordinates of the four combinations are sequentially positioned according to the progress of processing.

In this case, trial bending is performed while the coordinates (Di,Li) are slightly changed before processing for an actual product. The upper limit value coordinate of the ram 17 and the L-axis coordinate of the back gauge 21 which are required for the desired processing are calculated on the basis of the results (bending angle or the like) obtained in the trial bending so as to determine the optimum coordinates (Di,Li). Therefore, in the subsequent actual bending, bending operations are sequentially performed on the basis of the determined coordinates (Di,Li).

When a certain product is processed by bending the product N times, the work W is processed on the basis of the following N combinations of positioning coordinates.

$$(D1,L1), (D2,L2), (D3,L3), \ldots, (Di,Li), \ldots, (Dn,Ln)$$

Coordinates obtained when the jth work W of the certain product is processed is represented as follows:

$$(D1j,L1j), (D2j, L2j), \ldots, (Dij,Lij), \ldots, (Dnj,Lnj)$$

The coordinates of a (j−1)th work W before the jth work W of the certain product is represented as follows:

$$D1(j-1),L1(j-1)), \ldots, (Di(j-1),Li(j-1), \ldots, (Dn(j-1),Ln(j-1))$$

In this case, if $Di(j)=Di(j-1)$ and $Li(j)=Li(j-1)$ are established, a certain work W and a work W before the certain work W are processed on the basis of the same coordinate value. For this reason, it is determined that an actual bending operation is performed.

On the other hand, if $Di(j) \ne D(j-1)$ or $Li(j) \ne Li(j-1)$ are established as to at least one of the coordinate values, a certain work W and a work W before the certain work W are processed on the basis of different coordinate values. For this reason, it is determined that a trial bending operation is performed.

Figure 1:
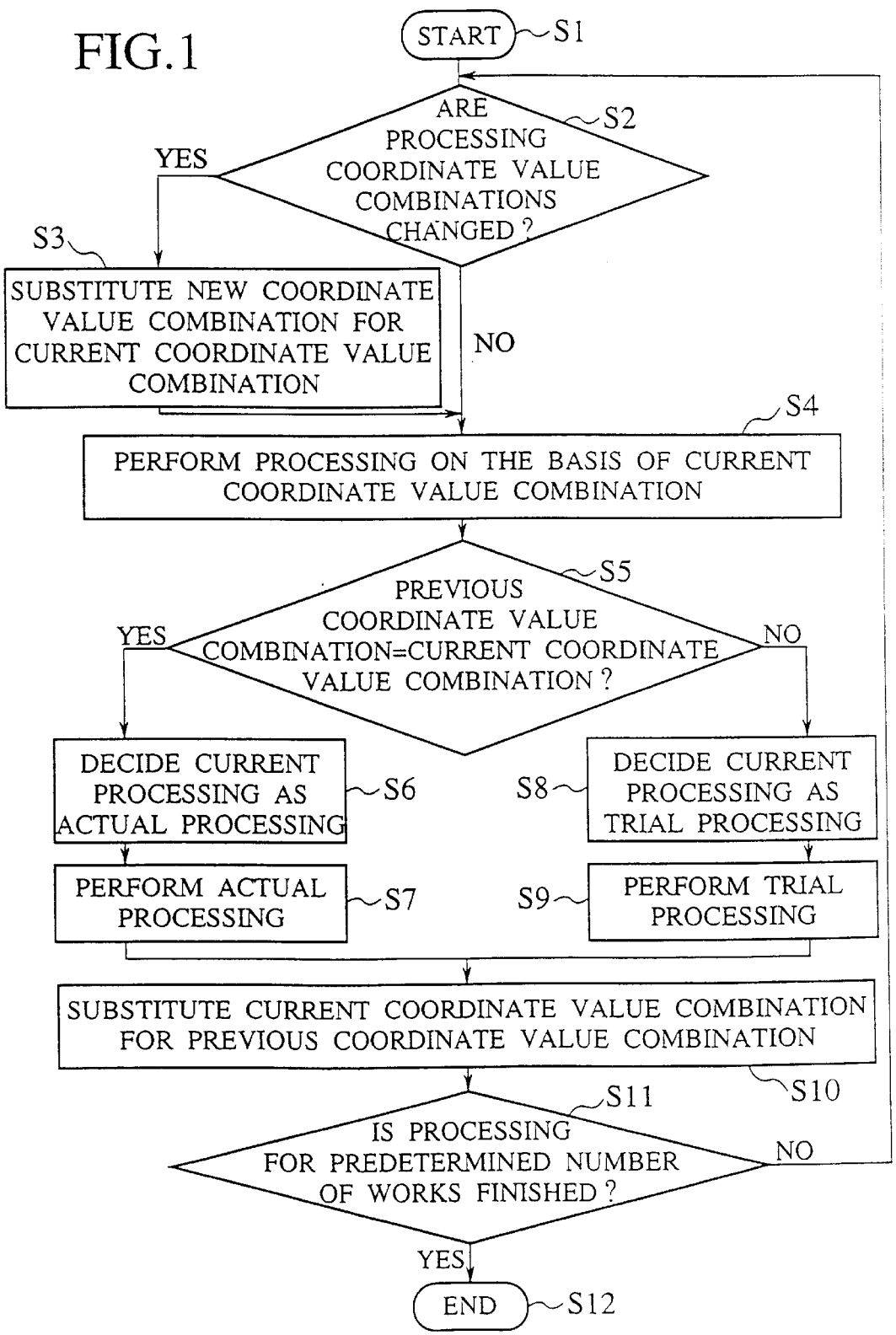
FIG. 1 is a flow chart showing a flow of a method of a recording operating status of an NC processing machine according to the present invention.

With the above consideration, a deciding operation between trial bending and actual bending in the NC apparatus 27 will be described below with reference to FIG. 2 and the flow chart shown in FIG. 1.

When processing is started (step S1), it is decided whether processing coordinate value combinations are changed, i.e., whether a new coordinate value combination is input from the keyboard 41 serving as an input means and a program for processing stored in the memory 33 (step S2). If changed in step S2, the new coordinate value combination is substituted for a current coordinate value combination for current processing to update the current coordinate value combination, and the new coordinate value combination is stored in the memory 37 (step S3). Processing is then performed using the current coordinate value combination (step S4). On the other hand, if the processing coordinate value combinations are not changed, step S3 is skipped.

Subsequently, the comparison/decision unit 35 compares the previous coordinate value combinations stored in the memory 37 with the current coordinate value combinations used in the processing (step S5). If they are equal in step S5, the processing is determined to be an actual processing (step S6), and an actual processing in which the processing is recorded as the actual processing in the recording unit 39 of the operation recording apparatus 29 is performed (step S7).

On the other hand, if they are not equal, the processing is determined to be a trial processing (step S8), a trial processing in which the processing is recorded as the trial processing in the recording unit 39 of the operation recording apparatus 29 is performed (step S9).

Thereafter, the current coordinate value combination is substituted for the previous coordinate value combination stored in the memory 37 (step S10). If processing for a predetermined number of works is finished (step S11), the processing is completed (step S12). If the processing is to be continuously performed, processing returns to step S2, and the above steps are repeated.

According to such a method and apparatus for recording operating status of an NC processing machine, the comparison/decision unit 35 of the operation recording apparatus 29 decides whether the performed processing is a trial processing or an actual processing, and the result is recorded on the recording unit 39. For this reason, the correct standard number of steps can be grasped, and rational production planing or highly reliable cost accounting can be performed.

Note that the present invention is not limited to the above embodiment. Another embodiment can be performed by properly changing the invention. More specifically, in the above embodiment, although the press brake 1 is used as an NC processing machine, the processor is not limited to the press brake. Any processor which is subjected to NC control by the NC apparatus 27 can be applied to this invention.

In this embodiment, as references for deciding trial processing or actual processing, a D-axis direction coordinate value serving as the upper limit value of the ram 17 and the L-axis coordinate value of the back gauge 21 for determining the L-axis direction position of a work W are used. However, the references are not limited to the above coordinate values, and proper processing conditions or the like can be used as the decision references.

The method of recording operating status of an NC processing machine according to the first aspect of the present invention is as described above. In order to record operating status in a case wherein the NC processing machine performs continuous processing according to a processing program, it is decided whether a processing condition for a currently processed work coincides with a processing condition for a work in previous processing. If the current processing condition coincides with the previous processing condition, the current processing is recorded as actual processing. If the current processing condition does not coincide with the previous processing condition, the current processing is recorded as trial processing. In this manner, it is automatically decided whether performed processing is trial processing or actual processing, and the result is recorded. For this reason, a clear working time arrangement can be grasped, and the grasp of the correct standard man-hour, and rational production planing or highly reliable cost accounting can be performed.

In the operating status recording apparatus of NC processing machine according to the second aspect of the present invention, in order to record an operating status in a case wherein the NC processing machine performs continuous processing according to a processing program, the comparison/decision unit decides whether a processing condition for a work stored in the memory and used in previous processing coincides with a processing condition for a work used in current processing. If the current processing condition coincides with the previous processing condition, the recording unit records the current processing as actual processing. If the current processing condition does not coincide with the previous processing condition, the recording unit records the current processing as trial processing. In this manner, it is automatically decided whether performed processing is trial processing or actual processing, and the result is recorded. For this reason, a clear working time arrangement can be known, and the grasp of the correct standard man-hour, and rational production planing or highly reliable cost accounting can be performed.

It should be understood that many modifications and adaptations of the invention will become apparent to those skilled in the art and it is intended to encompass such obvious modifications and changes in the scope of the claims appended hereto.

What is claimed is:

1. A method of recording an operating status of an NC processing machine, the method comprising:

comparing a processing condition currently employed with a processing condition previously employed;

determining whether the processing condition currently employed coincides with the processing condition previously employed:

recording the current processing as an actual operation if the processing condition currently employed coincides with the processing condition previously employed; and recording the current processing as a trial operation if the processing condition currently employed does not coincide with the processing condition previously employed.

2. The method of recording an operating status according to claim 1, further comprising:

(a) inputting a new processing condition to be employed in current processing;

(b) determining whether the new processing condition equals a current processing condition;

(c) substituting the new processing condition for the current processing condition if the new processing condition does not equal the current processing condition; and (d) processing with the current processing condition;

wherein (a), (b) (c) and (d) are performed before the comparing of processing conditions.

3. The method of recording an operating status recording of claim 1, wherein the NC processing machine is a press brake machine which performs a bending operation.

4. The method of recording an operating status recording apparatus of claim 1, in which the processing condition currently employed is defined by coordinates and the processing condition previously employed is defined by coordinates.

5. An operating status recording apparatus of an NC processing machine, said apparatus comprising:

a memory for storing a processing condition previously employed;

a decision unit for deciding whether a processing condition currently employed coincides with the processing condition stored in said memory; and a recording unit for recording the current processing as an actual operation if the processing condition currently employed coincides with the processing condition stored in memory and for recording the current processing as trial processing operation if the processing condition currently employed does not coincide with the processing condition stored in memory.

6. The operating status recording apparatus of claim 5, further comprising an input system which inputs a new processing condition to be employed in current processing.

7. The operating status recording apparatus of claim 6, further comprising:

a comparator which determines whether the new processing condition is different from the current processing condition;

a second memory which stores the current processing condition and overwrites the current processing condition with the new processing condition if the new processing condition is different from the current processing condition; and a processor which performs processing using the processing condition currently stored in the second memory.

8. The operating status recording apparatus of claim 7, in which the first memory and the second memory comprise a storage memory.

9. The operating status recording apparatus of claim 8, in which the storage memory stores a number of products to be processed.

10. The operating status recording apparatus of claim 6, in which the input system comprises a keyboard.

11. The operating status recording apparatus of claim 6, in which the input system comprises a computer program stored in a storage memory.

12. The operating status recording apparatus of claim 5, further comprising a CRT output system for displaying information.

13. The operating status recording apparatus of claim 5, wherein which the NC processing machine comprises a press brake machine.

14. The operating status recording apparatus of claim 13, further comprising a ram to perform the bending operation and a motor for driving the ram in accordance with the processing condition currently employed.

15. The operating status recording apparatus of claim 5, in which the processing condition currently employed is defined by coordinates and the processing condition previously employed is defined by coordinates.

* * * * *